US007017962B2

(12) United States Patent
Toensing

(10) Patent No.: US 7,017,962 B2
(45) Date of Patent: Mar. 28, 2006

(54) STAKE REMOVAL TOOL

(76) Inventor: James Toensing, 7930 S. Ash Ave., Tempe, AZ (US) 85284

( * ) Notice: Subject to any disclaimer, the term of this patent is extended or adjusted under 35 U.S.C. 154(b) by 131 days.

(21) Appl. No.: 10/765,407

(22) Filed: Jan. 26, 2004

(65) Prior Publication Data

US 2004/0195848 A1 Oct. 7, 2004

Related U.S. Application Data

(63) Continuation-in-part of application No. 10/224,708, filed on Aug. 20, 2002, now abandoned.

(51) Int. Cl.
*B65G 7/12* (2006.01)

(52) U.S. Cl. ...................... 294/16; 254/29 R; 294/902

(58) Field of Classification Search ................. 294/16, 294/50.8, 110.1, 101, 102.1, 102.2, 113, 114, 294/902; 254/29 R, 30, 121, 122, 131
See application file for complete search history.

(56) References Cited

U.S. PATENT DOCUMENTS 877,012 A * 1/1908 Sullivan ..................... 294/16
1,094,113 A * 4/1914 Bissen et al. ............ 254/29 R
1,364,589 A * 1/1921 Schultz ..................... 254/29 R
1,469,911 A * 10/1923 Aumiller ................. 254/29 R
1,837,990 A * 12/1931 Otis ........................... 188/67
2,160,891 A * 6/1939 Neff .......................... 294/111
2,376,676 A * 5/1945 Ferguson .................... 254/30
2,688,512 A * 9/1954 Cadorette .................. 294/106
3,119,597 A * 1/1964 Stephens ................. 254/29 R
3,137,520 A * 6/1964 Larouche ................... 294/113
4,671,493 A * 6/1987 Ravencroft ................ 254/131
4,795,202 A * 1/1989 Mader ......................... 294/16
6,302,376 B1* 10/2001 Williams .................... 254/30

* cited by examiner

*Primary Examiner*—Dean J. Kramer

(57) ABSTRACT

A stake removal tool, in one embodiment, includes a link bar (105, 405), a first handle (110, 410) and a second handle (120, 420) coupled to the link bar, a first gripper (130) attached to the first handle, and a second gripper (140) attached to the second handle. Each of the first and second grippers comprise a first surface (231, 241) and a second surface (232, 242) spaced apart by a circumferential face (233, 243), and at least one circumferential ridge (234, 244) protruding from and extending circumferentially along at least a portion of the circumferential face. The at least one circumferential ridge is substantially parallel to the first and second surfaces. In another embodiment, the first and second handles include integral gripping surfaces (539, 549).

11 Claims, 5 Drawing Sheets

FIG. 6

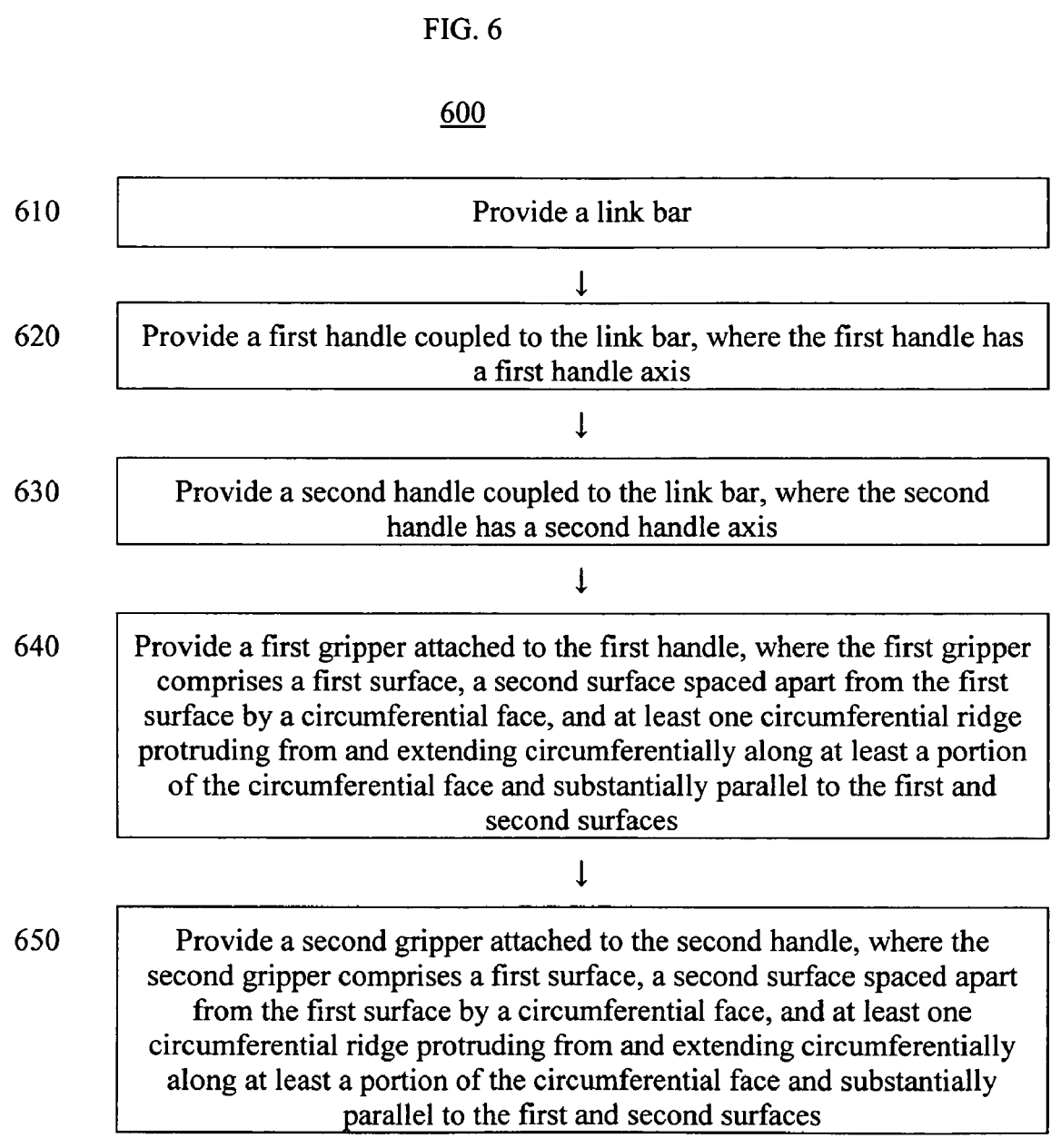

600

610 Provide a link bar

↓

620 Provide a first handle coupled to the link bar, where the first handle has a first handle axis

↓

630 Provide a second handle coupled to the link bar, where the second handle has a second handle axis

↓

640 Provide a first gripper attached to the first handle, where the first gripper comprises a first surface, a second surface spaced apart from the first surface by a circumferential face, and at least one circumferential ridge protruding from and extending circumferentially along at least a portion of the circumferential face and substantially parallel to the first and second surfaces

↓

650 Provide a second gripper attached to the second handle, where the second gripper comprises a first surface, a second surface spaced apart from the first surface by a circumferential face, and at least one circumferential ridge protruding from and extending circumferentially along at least a portion of the circumferential face and substantially parallel to the first and second surfaces

STAKE REMOVAL TOOL

This application is a continuation-in-part of prior application Ser. No. 10/224,708, filed Aug. 20, 2002 now abandoned.

FIELD OF THE INVENTION

This invention generally relates to mechanical tools, and more particularly to a tool for removing stakes from the ground.

BACKGROUND OF THE INVENTION

Stakes are used extensively in the concrete construction trade. The stakes are commonly cylindrical in shape and made from metal, although other materials like wood or plastic may be used. When concrete is poured, it is in a semi-liquid state and forms are required to constrain the concrete to a desired shape or boundary. The stakes, which are typically driven into the ground with a sledgehammer, hold the forms in place while the concrete dries.

Once the concrete has hardened, the stakes must be pulled from the ground so the forms may be removed. Currently, this is a very laborious and time consuming task caused, primarily, by two factors. First, the stakes are driven deep into hard-packed soil, often to a depth of 30 inches or more. A great deal of physical effort is required to free the stake from the ground and, with the primitive tools currently available, it is often easier to simply abandon the stake by driving it below the ground's surface. The loss of stakes in this manner adds an additional penalty to an already costly process. Second, the large quantity of stakes required for the average construction project amplifies the stake removal problem. Even a small improvement over existing methods will add up to a significant time savings when several hundred stakes must be pulled.

Several patented devices attempt to solve the problems mentioned above, but all such devices are large, cumbersome, and unwieldy, and do not allow the application of all forces necessary for extraction. One such device is described in U.S. Pat. No. 6,302,376 to Williams, dated Oct. 16, 2001. The Williams patent depicts a device that relies on a fulcrum and lever arm to provide a mechanical advantage for easier removal of stakes. This device, however, does not lend itself well to removing concrete form stakes for several reasons. First, the overhang on the gripping end would interfere with the form. Second, the fulcrum rests on the ground, which is often uneven or littered with concrete that has spilled over the form, possibly rendering the device useless. Another example is U.S. Pat. No. 4,671,493 to Ravencroft, dated Jun. 9, 1987. This device uses a scissor action for gripping the stake, and a lever motion, utilizing the top of the form as its fulcrum, to pull the stake from the ground. The major drawback of this device, which the previous example also shares, is that several ratcheting/clamping motions are required before the stake is fully extracted from the ground. A better design would allow the stake to be pulled using a single fluid motion.

Other devices are intended to extract objects from the ground but, because they impart purely vertical motion to the object, do not function well, especially where concrete form stakes are involved. For example, U.S. Pat. No. 2,376,676 to Ferguson, dated May 22, 1945, describes an extractor tool with grippers that maintain their grip on an embedded object by means of serrated clamping jaws, where the serrations are situated parallel to the ground. This orientation of the serrations allows the grippers to maintain hold on the object while vertical force is being applied thereto, but is not well suited for maintaining a grip during the application of force from other directions. Another example occurs in U.S. Pat. No. 1,469,911 to Aumiller, dated Oct. 9, 1923. The Aumiller patent depicts and describes a pipe lifting implement wherein a pipe lifting device and a pipe supporting device both have serrated jaws that act, respectively, to lift the pipe vertically and to maintain the pipe in an elevated position. As with the Ferguson patent, the Aumiller patent does not show or describe a tool capable of imparting any force other than a vertical force—perpendicular to the ground—to the stake or other embedded object. Accordingly, a need exists for a tool capable of imparting both vertical and other forces to a stake or other embedded object, and to be capable of maintaining a firm grip on the object during the application of all such forces.

SUMMARY OF THE INVENTION

In one embodiment of the invention, a stake removal tool comprises a link bar, a first handle and a second handle coupled to the link bar, a first gripper attached to the first handle, and a second gripper attached to the second handle. Each of the first and second grippers comprise a first surface and a second surface spaced apart by a circumferential face, and at least one circumferential ridge protruding from and extending circumferentially along at least a portion of the circumferential face. The at least one circumferential ridge is substantially parallel to the first and second surfaces. In another embodiment, a first end of the first and second handles comprises a first surface and a second surface spaced apart by a gripping surface, and the gripping surface has a circumferential face from which at least one circumferential ridge protrudes and extends circumferentially along at least a portion of the circumferential face.

BRIEF DESCRIPTION OF THE DRAWINGS

The invention will be better understood by considering the accompanying detailed description in conjunction with the following figures in the drawings, in which:

FIG. 6 is a flow chart illustrating a method of removing a stake from the ground according to an embodiment of the invention.

Figure 1:
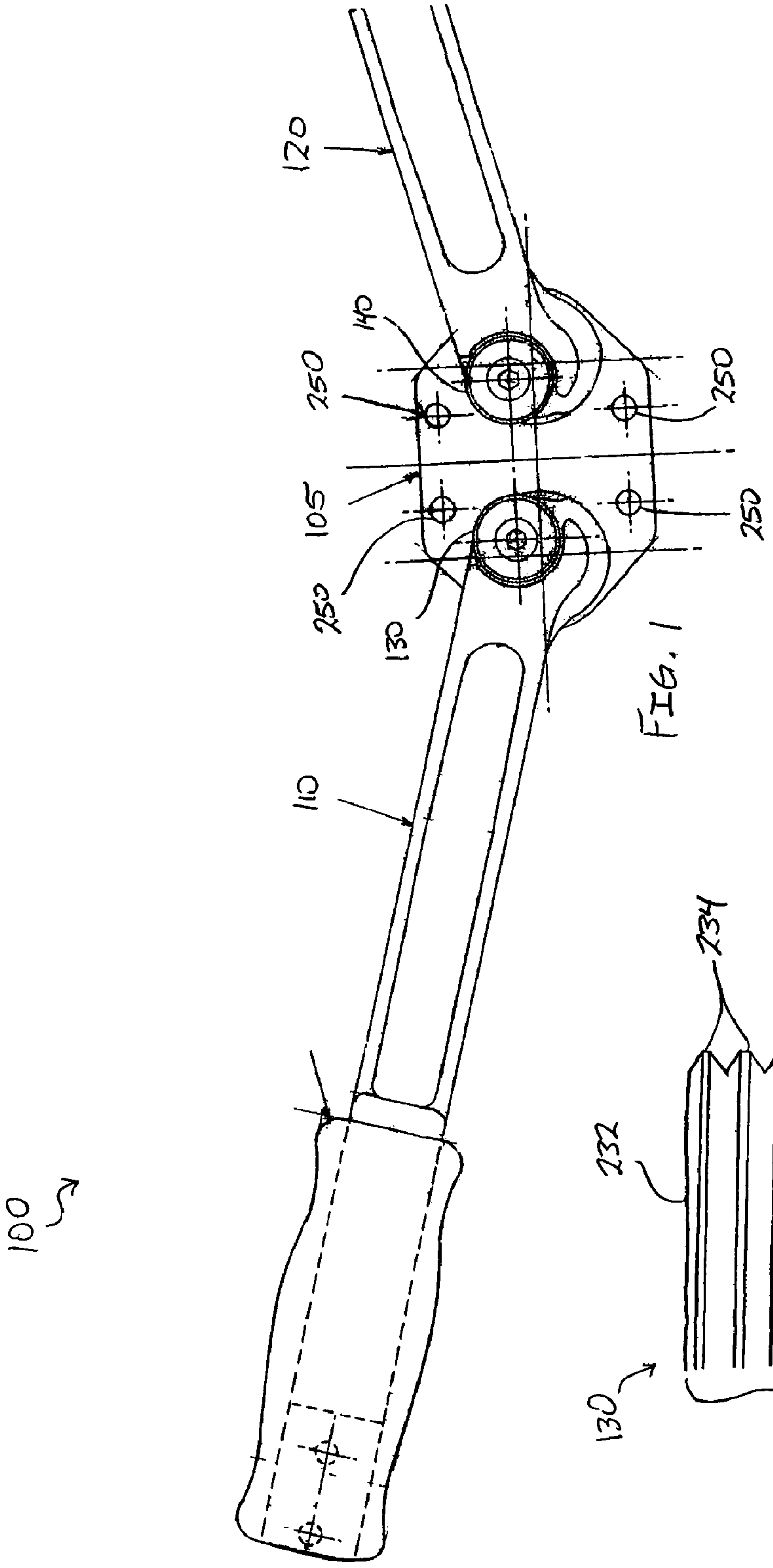
FIG. 1 is a front view of a portion of a stake removal tool according to an embodiment of the invention.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms “first,” “second,” “third,” “fourth,” and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms “comprise,” “include,” “have,” and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms “left,” “right,” “front,” “back,” “top,” “bottom,” “over,” “under,” and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term “coupled,” as used herein, is defined as directly or indirectly connected in a mechanical or other manner.

DETAILED DESCRIPTION OF THE DRAWINGS

In one embodiment of the invention, a stake removal tool comprises two handles connected by a link bar utilizing freely rotating joints. The link bar includes a feature to facilitate alignment of the invention with the stake. A gripper is attached to each handle on the end closest to the link bar, which enables the operator of the tool to get a firm hold on the upper protruding portion of the stake. The gripper is secured to the handle by a screw in a position that is slightly off center from an axis of the handle so that when the operator swings the handles upwards the grippers are moved towards the stake. This eccentricity between the grippers and the handle axis vectors the vertical force the operator applies to the handles into compressive force exerted on the sides of the stake by the grippers. Thus, the two grippers, mounted opposite from one another, trap the stake between them, and the gripping force they apply to the stake increases as the operator increases the vertical lifting force.

In order to pull a stake from the ground, the operator stands facing the stake with his feet planted, for example, approximately shoulder width apart. With the stake centered in front of him, the operator holds the invention with one handle in each hand. The handles may be held roughly horizontal to the ground to ensure that the distance between the grippers is greater than the diameter of the stake. Next, the operator addresses the protruding stake with the stake removal tool by utilizing the alignment feature of the link bar to center the stake between the grippers. The operator then swings the handles upwards, thereby pinching the stake between the grippers. The long length of the handle compared to the small eccentricity between the gripper and the handle axis provides a mechanical advantage that amplifies the gripping force applied to the stake. This force amplification reduces the possibility that slippage will occur between the invention and the stake, and allows the stake to be pulled from the ground in one fluid vertical motion.

An object of the invention is to provide a stake removal tool that allows stakes to be pulled from the ground in a single fluid movement with a minimum amount of time and effort.

Another object of the invention is to provide a force-amplified, load-dependent means of gripping a stake. In other words, an object of the invention is to provide a gripping force exerted on a stake greater than, and proportional to, the vertical force required by the operator to remove the stake. This ensures that the necessary gripping force will be applied to the stake regardless of how difficult the stake is to remove.

Another object of the invention is to provide a pair of knurled, scored, ribbed, ridged, or otherwise patterned grippers designed to withstand continued use of the tool without undue deterioration in gripping performance.

Another object of the invention is to provide a compact tool that is easy to carry and use.

A further object of the invention is to provide a feature integral to the link bar that aligns and centers the tool relative to the stake such that the grippers are directly or substantially opposite each other.

Additional objects, features, and benefits will be documented in the remaining specification. Although the invention will be described in the context of stakes used to secure concrete forms, the invention may be applied to any stake or other object to be extracted from a medium. Additional benefits or applications may be obtained by modifying the invention within the scope of this disclosure.

Figure 2:
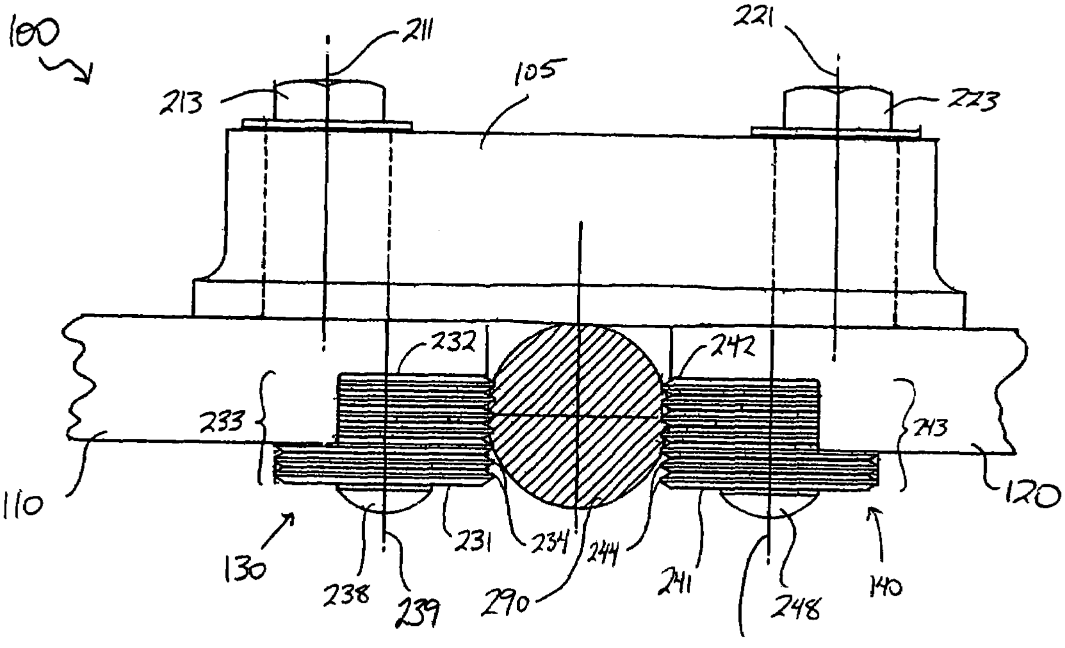
FIG. 2 is a top view of a portion of the stake removal tool of FIG. 1.

FIG. 1 is a front view of a portion of a stake removal tool 100 according to an embodiment of the invention. FIG. 2 is a top view of a portion of stake removal tool 100. As illustrated in FIGS. 1 and 2, stake removal tool 100 comprises a link bar 105, a handle 110 coupled to link bar 105 and having an axis 211, a handle 120 coupled to link bar 105 and having an axis 221, a gripper 130 attached to handle 110, and a gripper 140 attached to handle 120. In one embodiment, bolts 213 and 223 secure handles 110 and 120 to link bar 105 in such a way as to allow handles 110 and 120 to freely rotate about axes 211 and 221, respectively.

Gripper 130 comprises a surface 231 and a surface 232 spaced apart from surface 231 by a circumferential face 233. Gripper 130 further comprises at least one circumferential ridge 234 protruding from and extending circumferentially along at least a portion of circumferential face 233. In the illustrated embodiment, gripper 130 comprises a plurality of circumferential ridges 234. Circumferential ridge 234 is substantially parallel to surfaces 231 and 232. Similarly, gripper 140 comprises a surface 241 and a surface 242 spaced apart by a circumferential face 243. Gripper 140 further comprises at least one circumferential ridge 244 protruding from and extending circumferentially along at least a portion of circumferential face 243. In the illustrated embodiment, gripper 140 comprises a plurality of circumferential ridges 244. In at least one embodiment, circumferential ridge 244 is substantially parallel to surfaces 241 and 242. In at least one embodiment, grippers 130 and 140 may be patterned in such a way as to improve traction with stake 290. For example, circumferential faces 233 and 243 of grippers 130 and 140 may be knurled, scored, or otherwise patterned, in addition to or, in one embodiment, instead of, being provided with circumferential ridges. Other patterns may also be used.

Gripper 130 is coupled to handle 110 by a screw 238, and gripper 140 is coupled to handle 120 by a screw 248. As illustrated in FIG. 2, an axis 239 of screw 238 and gripper 130 is eccentric from axis 211 of handle 110. Similarly, an axis 249 of screw 248 and gripper 140 is eccentric from axis 221 of handle 120. If the patterned faces of grippers 130 and 140 become worn, screws 238 and 248 may be loosened and grippers 130 and 140 may be rotated to provide a fresh, unused patterned gripping surface for future engagement with stake 290. Grippers 130 and 140 are not free to rotate when screws 238 and 248 are tightened. Grippers 130 and 140 can be constructed of high endurance steel so as to promote long life even under heavy use conditions.

In use, circumferential ridges 234 and 244 of stake removal tool 100 penetrate a stake 290. Because circumferential ridges 234 and 244 are substantially parallel to a long axis of stake 290, circumferential ridges 234 and 244 are capable of maintaining a grip on stake 290 during a twisting motion of stake removal tool 100. In many cases, a simple vertical force applied to stake removal tool 100, for example via handles 110 and 120, is all that is required to pull stake 290 from the ground. However, several factors, including soil condition, the depth of stake 290 below the ground's surface, and imperfections on the surface of stake 290 may dramatically increase the amount of vertical force required to remove stake 290, at times making the stake impossible to remove using vertical lifting force alone. Circumferential ridges 234 and 244 allow a user of stake removal tool 100 to apply horizontal, twisting force to stake 290, thus making possible, or greatly facilitating, the removal of stake 290 from the ground or other medium in which stake 290 may be secured. The inventor has discovered, for example, that a twisting motion applied to a stake by stake removal tool 100 can reduce the vertical force necessary for stake extraction by as much as fifty percent or more. The twisting motion helps break the static friction between stake 290 and the ground. During the application of twisting force, a small amount of vertical force may be applied to handles 110 and 120 in order to keep grippers 130 and 140 engaged with stake 290.

Link bar 105 may comprise an alignment feature 250 capable of centering stake removal tool 100 with stake 290, and capable of holding stake removal tool 100 in a position to properly engage stake 290. In one embodiment, alignment feature 250 can comprise a plurality of posts protruding from link bar 105.

Figure 3A:
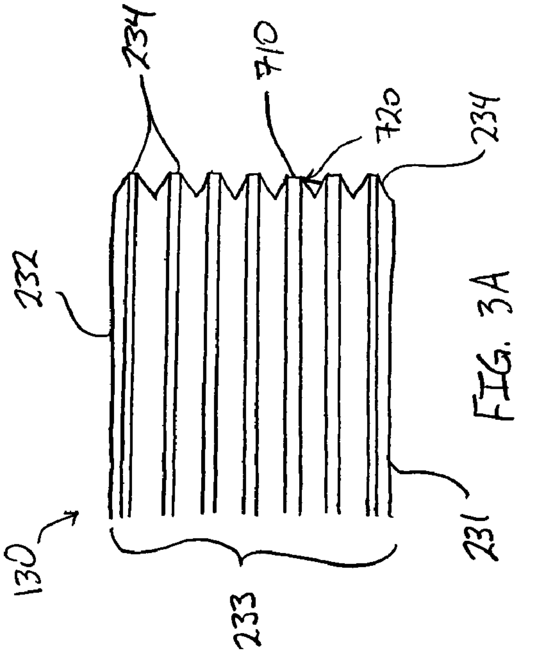
FIG. 3A is a side view of a portion of a gripper according to an embodiment of the invention.
Figure 3:
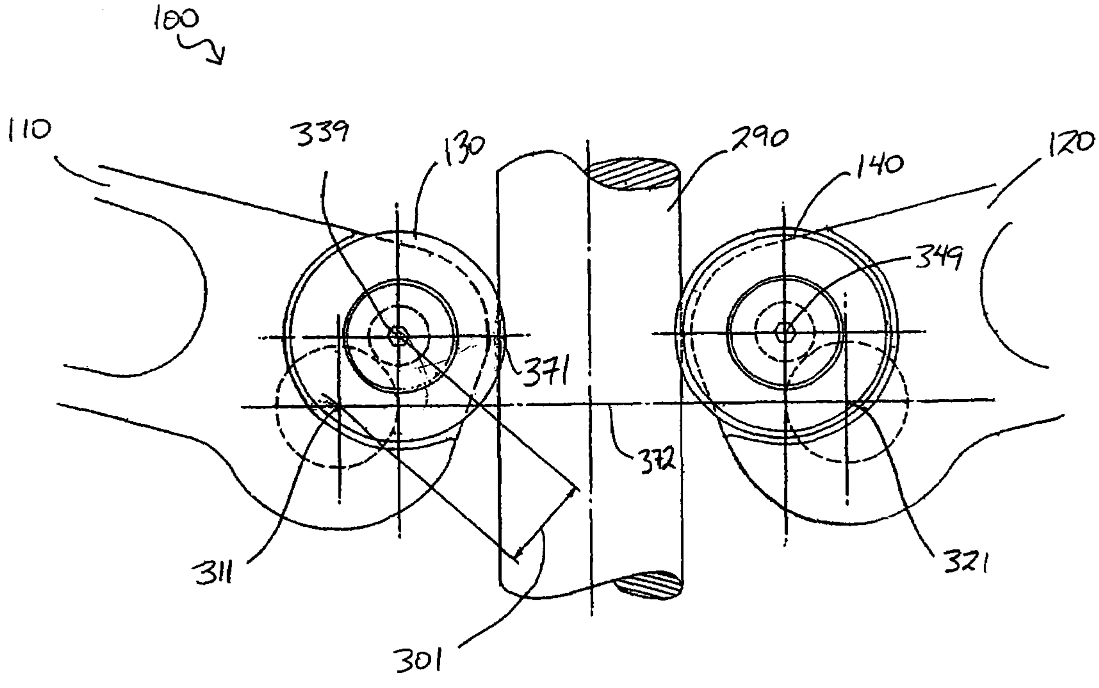
FIG. 3 is a front view of a portion of the stake removal tool of FIG. 1.

FIG. 3 is a front view of a portion of stake removal tool 100. Referring to FIGS. 2 and 3, axis 211 passes through handle 110 at a point 311, axis 239 passes through gripper 130 at a point 339, axis 221 passes through handle 120 at a point 321, and axis 249 passes through gripper 140 at a point 349. Points 311 and 339, and axes 211 and 239, are separated by an offset distance 301. In at least one embodiment, points 321 and 349, and axes 221 and 249, are also separated by offset distance 301. The eccentricity provided by offset distance 301 allows grippers 130 and 140 to move on an arc centered on axes 211 and 221. The eccentricity also creates an angle between: (1) a line extending between point 311 and a point 371 representing the "touch point" where gripper 130 touches stake 290; and (2) a line 372 that passes through points 311 and 321. This angle, referred to herein as the touch point angle, is an important part of the geometry of stake removal tool 100, and serves to transform and amplify the vertical force applied to handles 110 and 120 into compressive force exerted on the sides of stake 290 by grippers 130 and 140. In one embodiment, the touch point angle can be between approximately twenty-two and twenty-three degrees. A touch point angle in such a range allows an operator of stake removal tool 100 to grip stake 290 with sufficient force to remove stake 290 from the ground without developing such excessive force that circumferential ridges 234 and 244 dig into stake 290 and are difficult to release.

The compressive force exerted on stake 290 is influenced by the touch point angle and the ratio of the length of handles 110 and 120 to offset distance 301. Since the length of handles 110 and 120 is large in comparison to offset distance 301, a mechanical advantage is realized that amplifies the operator-supplied force. This mechanical advantage is at least approximately 14 to 1, and creates sufficient compressive force to crush grippers 130 and 140 into stake 290 with a force capable of actually indenting stake 290. The compressive force is a constant multiplicand greater than the vertical lifting the operator exerts. Hence the grip of the tool on stake 290 is always greater than the grip necessary to remove stake 290 from the ground. The compressive force on stake 290 increases as handles 110 and 120 are lifted upwards and grippers 130 and 140 are subsequently brought closer together, which further enhances the grip of stake removal tool 100 on stake 290.

FIG. 3A is a side view of a portion of gripper 130 according to an embodiment of the invention. As illustrated in FIG. 3A, at least one circumferential ridge 234 comprises a flat portion 710 at a first end 720 of at least one circumferential ridge 234. Although not illustrated in FIG. 3A, at least one circumferential ridge 244 of gripper 140 may also comprise a flat portion similar to flat portion 710 of gripper 130. Flat portion 710 increases the strength of circumferential ridge 234 and reduces the likelihood that circumferential ridges 234 will break, crack, or otherwise become damaged during use.

Figure 4:
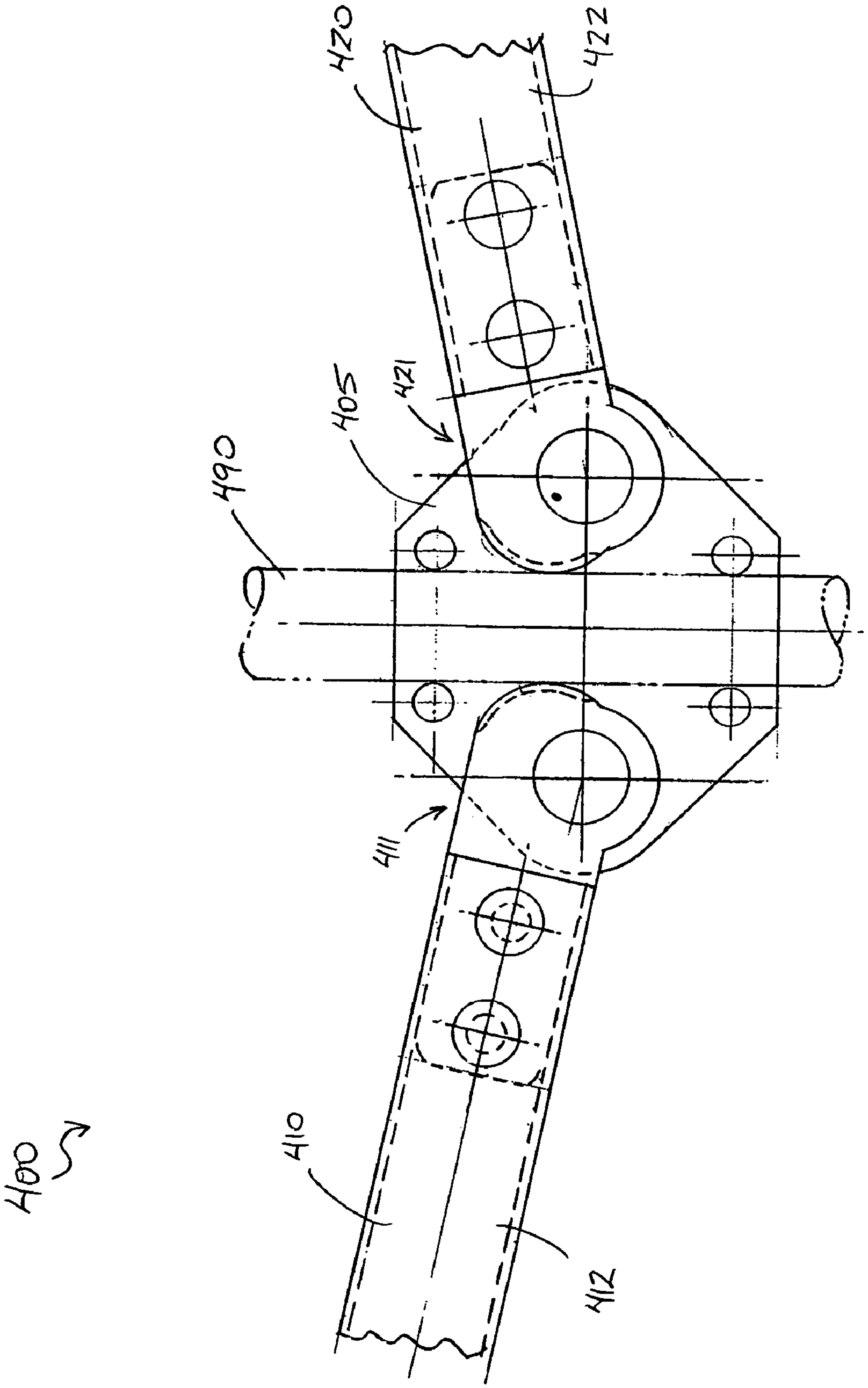
FIG. 4 is a front view of a portion of a stake removal tool according to another embodiment of the invention.
Figure 5:
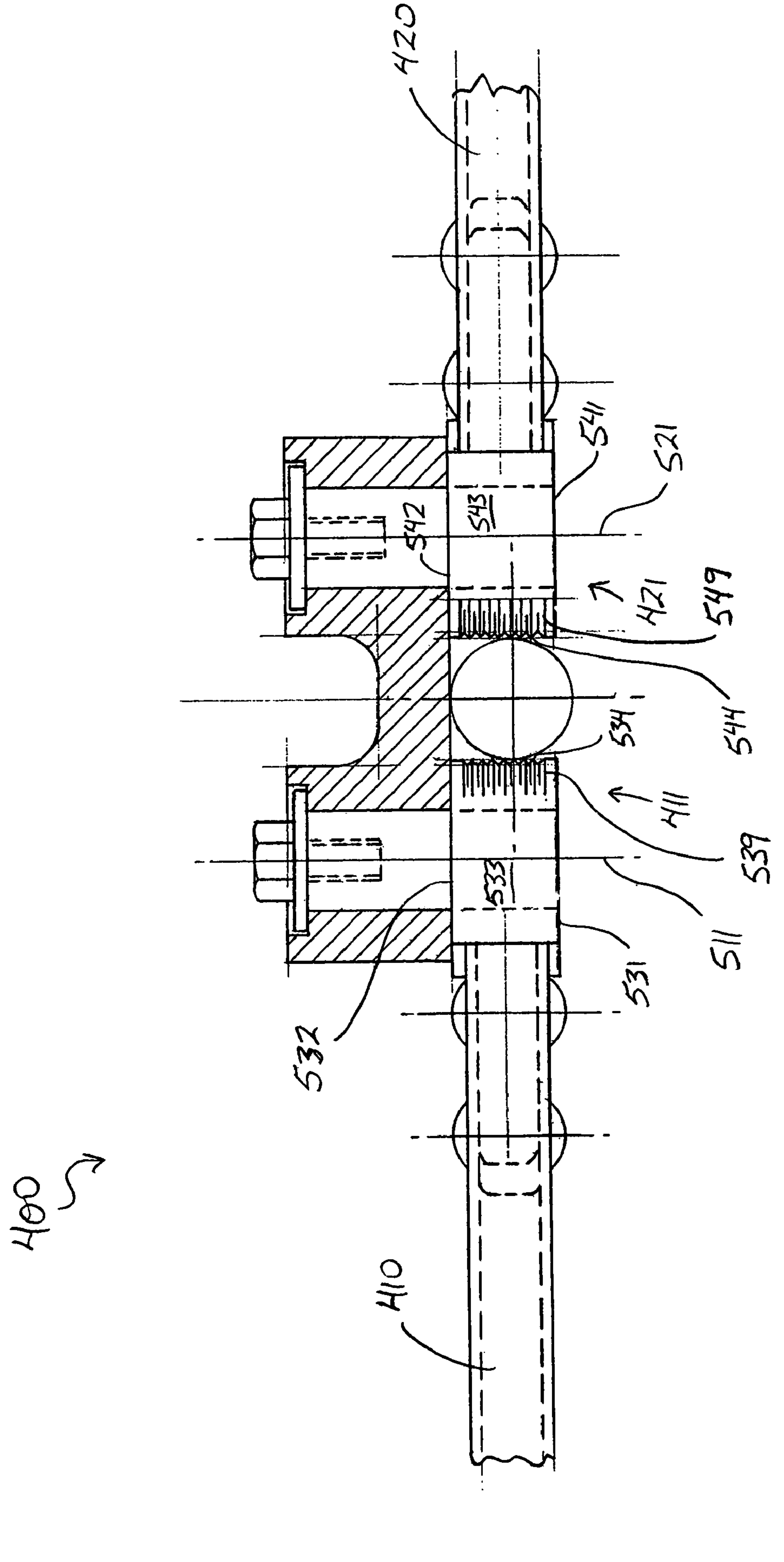
FIG. 5 is a top view of a portion of the stake removal tool of FIG. 4.

FIG. 4 is a front view of a portion of a stake removal tool 400 according to another embodiment of the invention. FIG. 5 is a top view of a portion of stake removal tool 400. As illustrated in FIGS. 4 and 5, stake removal tool 400 comprises a link bar 405, a handle 410 coupled to link bar 405 at an axis 511, and a handle 420 coupled to link bar 405 at an axis 521. Handle 410 comprises a shank 412, to be grasped by the operator, and an end 411 adjacent to link bar 405. Handle 420 comprises a shank 422, also to be grasped by the operator, and an end 421 adjacent to link bar 405.

End 411 comprises a surface 531, a surface 532 substantially parallel to surface 531, and a gripping surface 539 between and substantially perpendicular to surface 531. Gripping surface 539 comprises a circumferential face 533 coupling together surfaces 531 and 532, and further comprises at least one circumferential ridge 534 protruding from and extending circumferentially along at least a portion of circumferential face 533. In the illustrated embodiment, gripping surface 539 comprises a plurality of circumferential ridges 534. Circumferential ridge 534 is substantially parallel to surfaces 531 and 532.

Similarly, end 421 comprises a surface 541, a surface 542 substantially parallel to surface 541, and a gripping surface 549 between and substantially parallel to surface 541. Except for the fact that ends 411 and 421 are not removable from handles 410 and 420, ends 411 and 421 can be similar to grippers 130 and 140. Gripping surface 549 comprises a circumferential face 543 coupling together surfaces 541 and 542, and further comprises at least one circumferential ridge 544 protruding from and extending circumferentially along at least a portion of circumferential face 543. In the illustrated embodiment, gripping surface 549 comprises a plurality of circumferential ridges 544. Circumferential ridge 544 is substantially parallel to surfaces 541 and 542. Circumferential ridges 534 and 544 can be similar to circumferential ridges 234 and 244, first shown in FIG. 2.

FIG. 6 is a flow chart illustrating a method 600 of removing a stake from the ground according to an embodiment of the invention.

A step 610 of method 600 is to provide a link bar. As an example, the link bar can be similar to link bar 105, first shown in FIG. 1.

A step 620 of method 600 is to provide a first handle coupled to the link bar, where the first handle has a first handle axis. As an example, the first handle can be similar to handle 110, first shown in FIG. 1, and the first handle axis can be similar to axis 211, first shown in FIG. 2.

A step 630 of method 600 is to provide a second handle coupled to the link bar, where the second handle has a second handle axis. As an example, the second handle can be similar to handle 120, first shown in FIG. 1, and the second handle axis can be similar to axis 221, first shown in FIG. 2.

A step 640 of method 600 is to provide a first gripper attached to the first handle, where the first gripper comprises a first surface, a second surface spaced apart from the first surface by a circumferential face, and at least one circumferential ridge protruding from and extending circumferentially along at least a portion of the circumferential face and substantially parallel to the first and second surfaces. As an example, the first gripper can be similar to gripper 130, first shown in FIG. 1. As another example, the first surface can be similar to surface 231, the second surface can be similar to surface 232, the circumferential face can be similar to circumferential face 233, and the circumferential ridge can be similar to circumferential ridge 234, all of which were first shown in FIG. 2.

A step 650 of method 600 is to provide a second gripper attached to the second handle, where the second gripper comprises a first surface, a second surface spaced apart from the first surface by a circumferential face, and at least one circumferential ridge protruding from and extending circumferentially along at least a portion of the circumferential face and substantially parallel to the first and second surfaces. As an example, the second gripper can be similar to gripper 140, first shown in FIG. 1. As another example, the first surface can be similar to surface 241, the second surface can be similar to surface 242, the circumferential face can be similar to circumferential face 243, and the circumferential ridge can be similar to circumferential ridge 244, all of which were first shown in FIG. 2.

Although the invention has been described with reference to specific embodiments, it will be understood by those skilled in the art that various changes may be made without departing from the spirit or scope of the invention. Various examples of such changes have been given in the foregoing description. As an example, the handles could be reconfigured to allow for additional methods of applying a lifting force, such as using an electric or gas motor to replace the physical effort of a human operator.

Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the stake removal tool discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the invention, and may disclose alternative embodiments of the invention.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A stake removal tool comprising:

a link bar;

a first handle coupled to the link bar and having a first handle axis;

a second handle coupled to the link bar and having a second handle axis, where the first handle axis passes through the first handle at a first point, the second handle axis passes through the second handle at a second point, and the first point and the second point define a first line;

a first gripper attached to the first handle; and a second gripper attached to the second handle, wherein:

the first point is on a second line perpendicular to the first line;

the second point is on a third line;perpendicular to the first line;and parallel to the second line;

the first gripper comprises a first gripper axis and the second gripper comprises a second gripper axis;

the first gripper axis is offset from the first line;and from the second line;

the second gripper axis is offset from the first line;and from the third line;

each of the first and second grippers comprise:

a first surface and a second surface spaced apart by a circumferential face; and at least one circumferential ridge protruding from and extending circumferentially along at least a portion of the circumferential face; and the at least one circumferential ridge is substantially parallel to the first and second surfaces.

2. The stake removal tool of claim 1 wherein:

the first gripper axis is offset from the first handle axis by an offset distance; and the second gripper axis is offset from the second handle axis by the offset distance.

3. The stake removal tool of claim 2 wherein:

the first handle has a first length;

the second handle has a second length; and the first length is greater than the offset distance and the second length is greater than the offset distance.

4. The stake removal tool of claim 3 wherein:

the first length and the second length exceed the offset distance by an amount sufficient to create a mechanical advantage of at least approximately 14 to 1.

5. The stake removal tool of claim 3 wherein:

the first gripper is fixedly attached to the first handle such that the first gripper cannot rotate with respect to the first handle and the second gripper is fixedly attached to the second handle such that the second gripper cannot rotate with respect to the second handle.

6. The stake removal tool of claim 5 wherein:

the first handle is a first one of only two handles of the stake removal tool; and the second handle is a second one of the only two handles.

7. The stake removal tool of claim 1 wherein:

the link bar comprises an alignment feature.

8. The stake removal tool of claim 1 wherein:

the first gripper is removably attached to the first handle; and the second gripper is removably attached to the second handle.

9. The stake removal tool of claim 1 wherein:

the at least one circumferential ridge comprises:

a flat portion at a first end of the at least one circumferential ridge.

10. The stake removal tool of claim 1 wherein:

the first handle comprises a first surface coupled to the link bar and a second surface opposite the first surface;

the second handle comprises a third surface coupled to the link bar and a fourth surface opposite the third surface;

the link bar links together the first surface and the third surface; and the second surface and the fourth surface are free of any material that would link the second surface and the fourth surface, such that the second surface and the fourth surface are not linked together.

11. The stake removal tool of claim 1 wherein:

the first handle is a first one of only two handles of the stake removal tool; and the second handle is a second one of the only two handles.

* * * * *